United States Patent [19]
Naya et al.

[11] Patent Number: 4,995,311
[45] Date of Patent: Feb. 26, 1991

[54] DEVICE FOR MAKING LIQUID COFFEE

[75] Inventors: Masaru Naya, Tama; Masayuki Kuzumaki, Machida; Susumu Ishikawa, Sakai, all of Japan

[73] Assignees: Kabushiki Kaisha Toshiba, Kawasaki; Koyusha Co., Tokyo; Kanazawa Industry Co. Ltd., Sashima, all of Japan

[21] Appl. No.: 402,777

[22] Filed: Sep. 5, 1989

[30] Foreign Application Priority Data

Sep. 5, 1988 [JP] Japan ................... 63-221631

[51] Int. Cl.⁵ ............................................. A47J 31/00
[52] U.S. Cl. ......................................... 99/295; 99/306
[58] Field of Search ................. 99/279, 295, 306, 300, 99/304, 284, 288, 290, 292, 293; 426/433

[56] References Cited

U.S. PATENT DOCUMENTS 4,165,681  8/1979  Belinkoff .............................. 99/295
4,773,313  9/1988  Anson ................................... 99/295
4,811,657  3/1989  Rixen ................................... 99/295

FOREIGN PATENT DOCUMENTS

55-54998  12/1980  Japan .

Primary Examiner—Robert W. Jenkins
Attorney, Agent, or Firm—Cushman, Darby & Cushman

[57] ABSTRACT

A device for making or preparing liquid coffee comprises a main body having a pair of support rails, a dripper suspended from these rails. The dripper have a filter attached thereto and an outlet formed at the bottom thereof and containing coffee powder therein. A pot is located under the dripper and have an opening which is opposed to the outlet of the dripper at a certain interval. Hot water is supplied into the dripper to make liquid coffee, which is collected in the pot, passing through the outlet of the dripper and the opening of the pot. The dripper includes a holder attached to the paired support rails, a member connected to the holder and movable up and down. The movable member is mounted on the top of the pot to enclose the space between the outlet of the dripper and the opening of the pot to thermally shield liquid coffee flowing through the space from outside air when it is at its lower positions.

9 Claims, 8 Drawing Sheets

DEVICE FOR MAKING LIQUID COFFEE

BACKGROUND OF THE INVENTION

1. Field of the Invention

The present invention relates to a device for making or preparing liquid coffee while supplying hot water from a hot water supply means into a dripper in which coffee powder is contained.

2. Description of the Related Art

Japanese Utility Model Publication Sho No. 55-54998 discloses a liquid coffee making device comprising a main body having a bracket section at the upper portion thereof, a hot water supply means housed in the main body, a dripper attached to the bracket section of the main body, and a liquid coffee receiver located under the dripper. The dripper has an outlet at the bottom thereof. A cap for the liquid coffee receiver is provided with an opening. When the liquid coffee receiver is located under the dripper, this opening of the receiver is opposed to the outlet of the dripper at a certain interval. The dripper contains coffee powder therein and hot water is supplied into the dripper to make liquid coffee. The liquid coffee receiver collects liquid coffee flowing through the outlet of the dripper.

In the case of this conventional liquid coffee making device, the outlet of the dripper is separated from the opening of the liquid coffee receiver to have an interval between them, as described above. Liquid coffee made in the dripper flows from the outlet of the dripper into the opening of the liquid coffee receiver, passing through the interval between them. Therefore, liquid coffee contacts outside air, while passing through the interval, to thereby lower its temperature. Particularly when room temperature is low and in cases where no heating is applied to the liquid coffee receiver to keep liquid coffee hot and where it takes relatively long time to make liquid coffee as often seen in the liquid coffee making device used for business purpose, the temperature of liquid coffee thus made is more likely to be lowered.

SUMMARY OF THE INVENTION

The object of the present invention is therefore to provide a liquid coffee making device capable of easily and detachably attaching the liquid coffee receiver to the main body and minimizing a temperature decrease of liquid coffee.

A device for making or preparing liquid coffee according to the present invention comprises a main body having a bracket section; a dripper attached to the bracket section of the main body, said dripper having a filter attached thereto and an outlet formed at the bottom thereof and containing coffee powder therein; a liquid coffee receiver located under the dripper and having an opening which is opposed to the outlet of the dripper at a certain interval; and a means for supplying hot water into the dripper to make liquid coffee, which is collected in the liquid coffee receiver, passing through the outlet of the dripper and the opening of the liquid coffee receiver; wherein said dripper includes a holder attached to the bracket section of the main body, a means connected to the holder and movable up and down, said means serving to enclose the space between the outlet of the dripper and the opening of the liquid coffee receiver to thermally shield liquid coffee flowing through the space from outside air when it is at its lower position, and means formed on the holder to guide the outside air shielding means downward and upward.

When the outside air shielding means is at its upper position in this liquid coffee making device, it is kept above and remote from the liquid coffee receiver. This can prevent the dripper from hindering the liquid coffee receiver which is removed from and mounted on the main body.

When the outside air shielding means is at its lower position, it encloses the space between the outlet of the dripper and the opening of the liquid coffee receiver to prevent liquid coffee flowing through the space from contacting outside air and thermally shield liquid coffee from outside air. The temperature lowering of liquid coffee thus obtained can be therefore kept as little as possible.

BRIEF DESCRIPTION OF THE DRAWINGS

FIGS. 1 through 6 show a first embodiment of the coffee liquid making device according to the present invention, in which

DETAILED DESCRIPTION OF THE PREFERRED EMBODIMENTS

A first embodiment of the present invention will be described referring to FIGS. 1 through 6.

Figure 1:
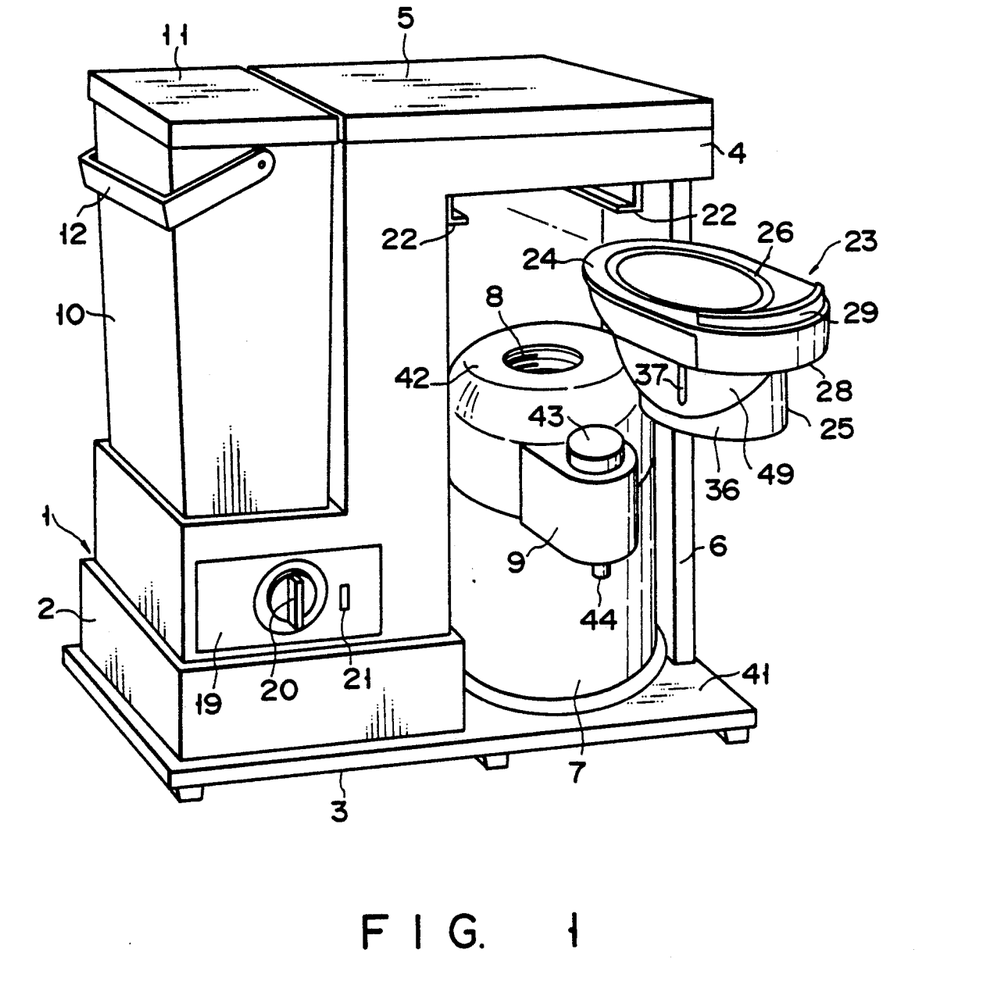
FIG. 1 is a perspective view showing the whole of the device.
Figure 2:
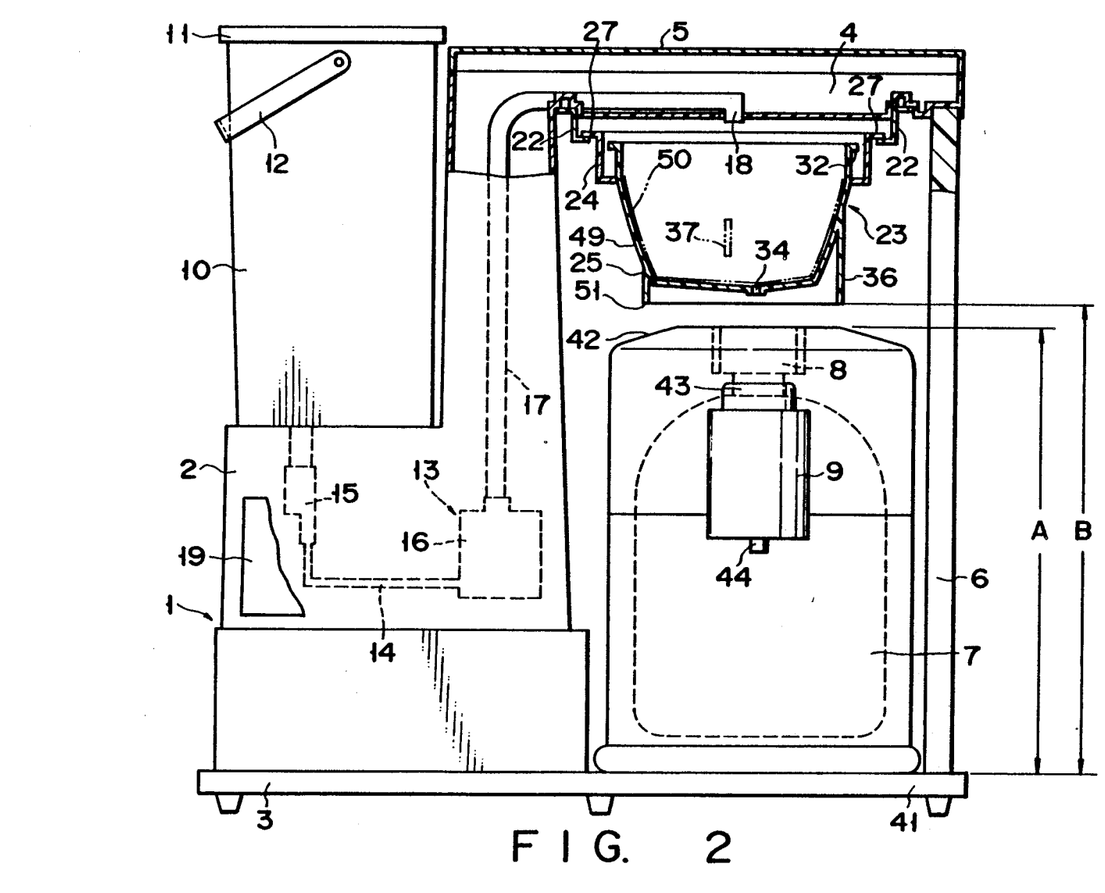
FIG. 2 is a front view showing the whole of the device partly sectioned and while keeping its movable member lifted.
Figure 3:
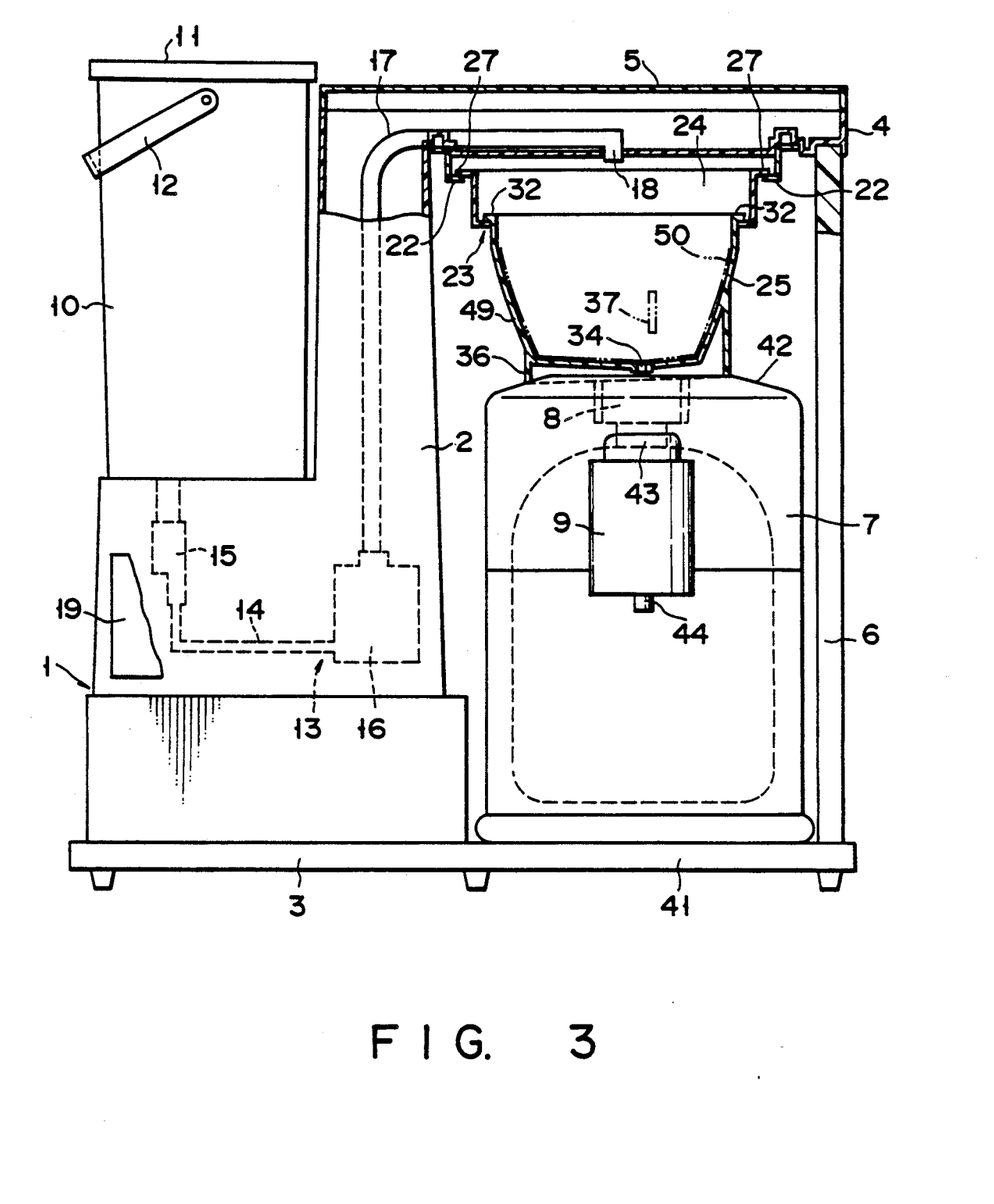
FIG. 3 is a front view showing the whole of the device partly sectioned and while keeping its movable member lowered.

Body 1 shown in FIGS. 1 through 3 has main portion 2, to the underside of which bottom plate 3 is attached. Upper extension 4 is horizontally projected from one side of the top of main portion 2. The top of main portion 2 including upper extension 4 is covered by ceiling plate 5. The right half of bottom plate 3 shown in FIGS. 1 through 3 is projected rightward from main portion 2 to form base 41 which is opposed to upper extension 4. Base 41 and upper extension 4 are connected with each other at their right sides by means of pillar 6.

A coffee liquid receiving means such as pot 7 of the jar type is detachably mounted on base 41. Inlet opening 8 which is closed by a plug (not shown) is formed in the center of top 42 of pot 7. The front side of pot 7 is provided with pouring means 9 of the air pressure type, which serves to raise the air pressure in pot 7, in which coffee liquid has been collected, by pushing its push member 43 from above. When the air pressure in pot 7 is raised in this manner, coffee liquid in pot 7 is poured outside through pouring outlet 44.

A tank such as water supply tank 10 of the cassette type is detachably attached to body 1. A water supply valve (not shown) is arranged in the bottom of water supply tank 10. This water supply valve is opened only when water supply tank 10 is attached to body 1, but it is closed when tank 10 is detached from body 1. Reference numeral 11 denotes a cap detachably attached to the top of water supply tank 10, and reference numeral 12 a handle for carrying tank 10.

Body 1 houses hot water supply means 13, which includes water supply pipe 14 communicated with a receiving side (not shown) of the water supply valve, backflow stopper 15 located in water supply pipe 14 on the receiving side of the water supply valve, heating means 16 connected to the front of water supply pipe 14, and hot water supply pipe 17 connected to the outlet of heating means 16, as apparent from FIGS. 2 and 3.

Heating means 16 includes an electric heater (not shown). This electric heater serves to heat water supplied into heating means 16 to hot water. Heating means 16 repeats its function of pumping hot water into hot water supply pipe 17 due to the pressure of vapor created therein when water is changed into hot water. Backflow stopper 15 allows water only to flow from water supply tank 10 to heating means 16, but it prevents water from being directed to water supply tank 10 by the pumping function of heating means 16.

The front end portion of hot water supply pipe 17 is housed in upper extension 4 and has hot water supply opening 18 at the front end thereof. Hot water supply opening 18 is directed downward, passing through the bottom of upper extension 4 in the center thereof. Reference numeral 19 in FIG. 1 represents an operation panel which is provided with timer 20 for setting a time during which power is applied to heating means 16, and lamp 21 for showing that power is being applied to heating means 16.

A pair of brackets, which are support rails 22 are attached to the underside of upper extension 4. These support rails 22 are opposed to each other, located on the left and right, respectively, when viewed from the front of extension 4 extending in the width direction of upper extension 4.

Dripper 23 is detachably attached to these support rails 22 and located above pot 7. This dripper 23 comprises holder 24 made of plastics as a unit, an outside air shielding means such as movable member 25, stopper ring 26 and guide means 30 formed on holder 24, as shown in detail in FIGS. 4 through 6.

The top of holder 24 is provided with an opening, along the rim of which ring-shaped flange 52 is horizontally projected outward. Left and right sides of flange 52 serve as hooks 27 slidably mounted on support rails 22, respectively.

The front end of flange 52 is provided with downward- and upward-convexes 29 and 28. Downward con-vex 28 serves as a grip held by hand when dripper 23 itself is attached to and released from support rails 22, while upward convex 29 serves to close the space between support rails 22 when dripper 23 itself is hung from support rails 22.

Bottom 53 of holder 24 is provided with circular opening 45 and circumferential wall 54 erected therefrom. Circumferential wall 54 is ring-shaped and provided with four guide means 30 on the inner face thereof. These guide means 30 are arranged on a same circle at a certain interval. Each of guide means 30 has slope 46 gradually rising from bottom 53 of holder 24, plane 47 horizontally extending from the top of slope 46, and step 48 continuous from plane 47. Four stopper projections 31, each adjacent to each of steps 48, are formed on the inner face of circumferential wall 54.

Movable member 25 includes filter housing section 49 and cylinder section 36. Paper filter 50 is housed in section 49 in a manner to extend along the inner surface of section 49. An appropriate amount of coffee powder is contained in filter 50. Coffee grains are obtained by milling roasted coffee beans. Filter housing section 49 is shaped like a cup, having an opening at the top, and four hooks 32 are projected outward from the top rim of section 49. Four stoppers 33 are also projected outward from the top rim of section 49 and each of these stoppers 33 is continuous from its corresponding hook 32.

The distance extending from the center of section 49 to the outer front end of hook 32 is smaller than that extending from the center of holder 24 to the inner face of the circumferential wall. The distance extending from the center of filter housing section 49 to the outer front end of stopper 33 is a little smaller than that extending from the center of holder 24 to the inner face of guide 30.

Cylinder section 36 is made integral to filter housing section 49, extending downward from the underside of section 49 and enclosing outlet 34 in the bottom of section 49. The bottom of cylinder section 36 is opened and the lower end thereof is projected downward below outlet 34.

Figure 6:
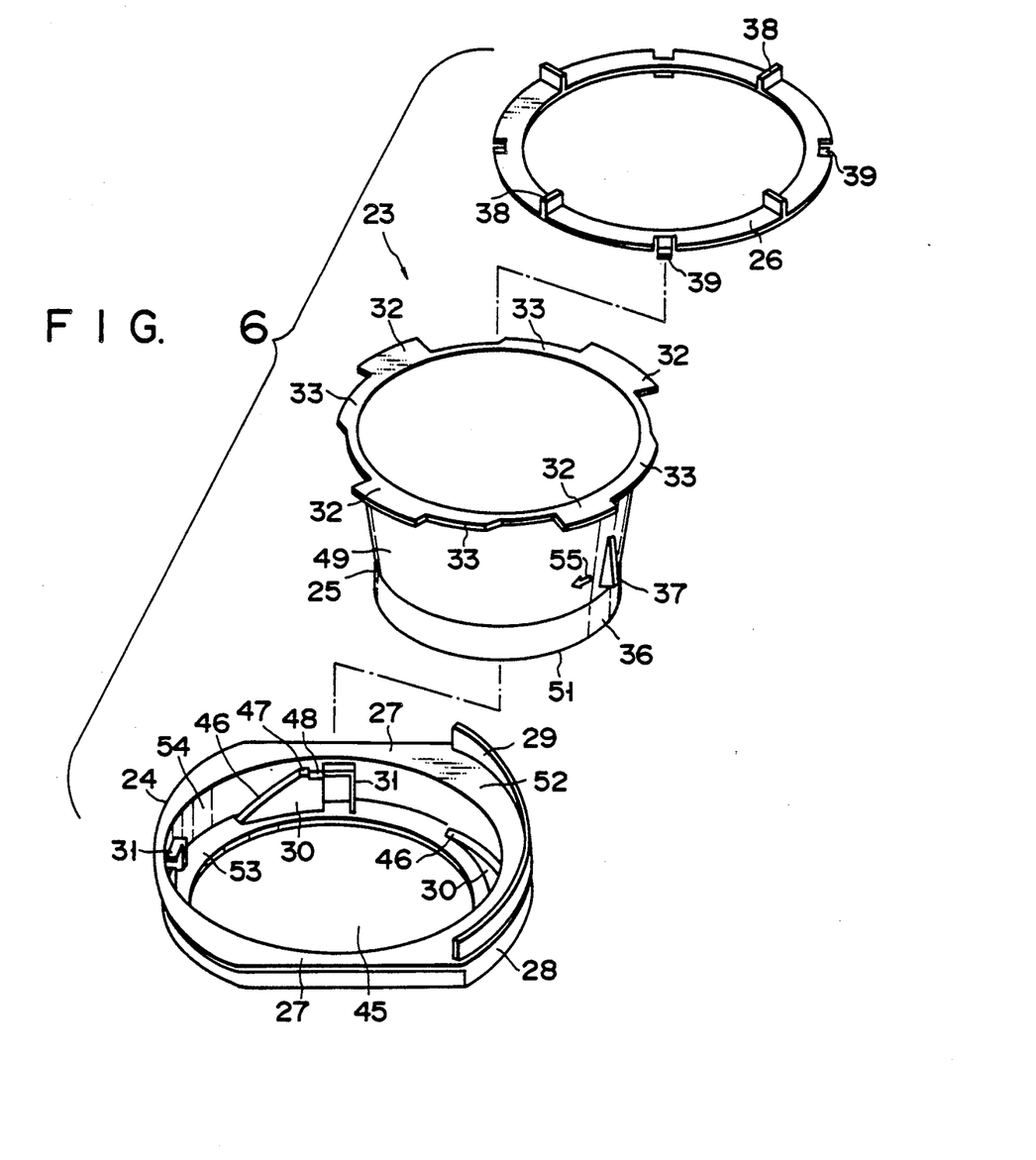
FIG. 6 is a perspective view showing the dripper dismantled.

Operation knob 37 is projected outward from the outer face of movable member 25. This operation knob 37 is used to rotate movable member 25 and shaped like a rib directed in the vertical direction. Marks 55 are attached to both sides of operation knob 37 on the outer face of movable member 25. Only one of these marks 55 is shown in FIG. 6. These marks 55 denote those directions in which movable member 25 is rotated to move up and down.

Movable member 25 is attached from above to holder 24. Hooks 32 of movable member 25 are seated onto bottom 53 of holder 24 or planes 47 of guide means 30 so that movable member 25 can be prevented from falling through opening 45 of holder 24 and held rotatable and movable up and down.

Stopper ring 26 is intended to prevent movable member 25 from coming upward out of holder 24. The upper face of ring 26 has plural projections 38, which are used as knobs to hold by fingers when ring 26 is to be rotated. The underside of stopper ring 26 is provided with plural hooks 39 which are detachably engaged with stopper projections 31, respectively.

Figure 4:
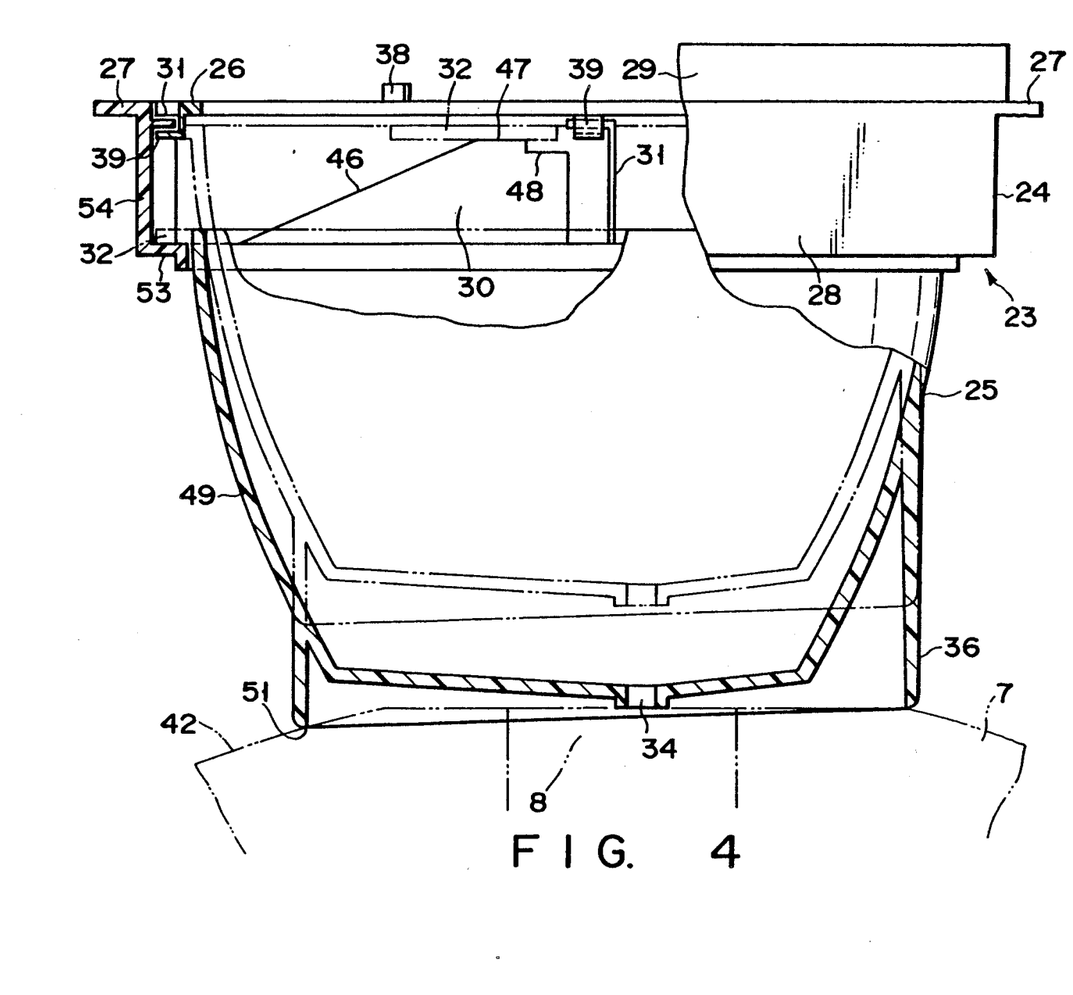
FIG. 4 is a front view showing a dripper almost sectioned.
Figure 5:
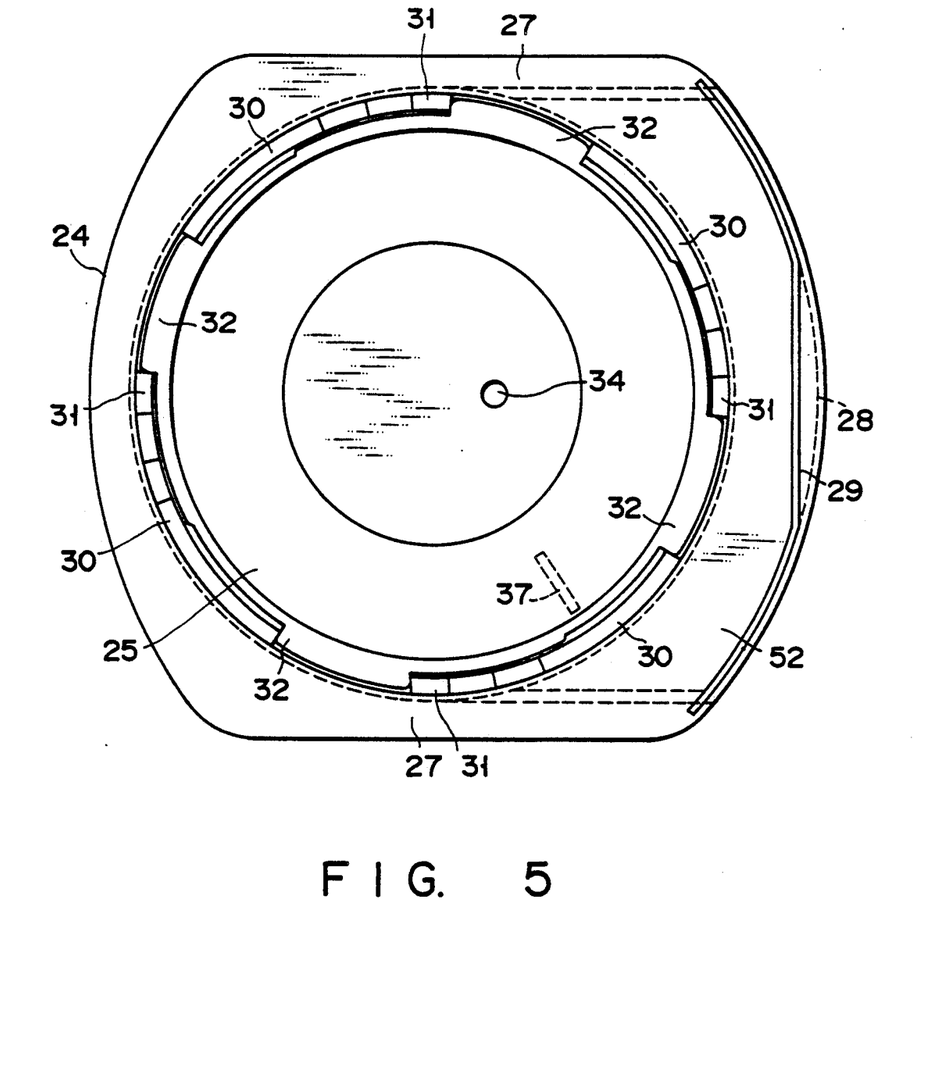
FIG. 5 is a plan showing the dripper with its stopper ring removed.

Hooks 39 of stopper ring 26 are seated onto steps 48 of guides 30 and stopper ring 26 is then a little rotated to move its hooks 39 toward stopper projections 31. Hooks 39 are thus located under horizontal portions of stopper projections 31, as shown in FIG. 4, so that stopper ring 26 can be attached to the top of holder 24.

The cleaning of dripper 23 can be attained in such a way that stopper ring 26 is removed in a manner reverse to the above-described one, that movable member 25 and holder 24 are separated from each other and that these movable member and holder are washed.

When dripper 23 is pushed backward, hanging its both side hooks 27 from support rails 22, it can be attached to the upper portion of body 1. When movable member 25 is held at its upper position, its hooks 32 are seated on planes 47 of guides 30, as shown by two-dot and dash lines in FIG. 4. Distance B between lower end face 51 of movable member 25, which has been held at its upper position, and base 41 is therefore longer than total length A of pot 7 mounted on base 41. This can prevent dripper 23 from becoming a hindrance against pot 7 which is attached to and released from base 41 with its plug removed. Pot 7 which is located under dripper 23 is mounted on base 41 in such a way that its opening 8 is opposed to outlet 34 of dripper 23 at a certain interval.

In the case of making liquid coffee, movable member 25 is rotated anticlockwise by operation knob 37 while keeping pot 7 located under dripper 23. Hooks 32 of movable member 25 are thus released from planes 47 of guides 30 and slid down along slopes 46 of guides 30. Hooks 32 are thus seated on bottom 53 of holder 24. The rotation of movable member 25 is stopped when hooks 32 are struck against vertical portions of their adjacent stopper projections 31.

When movable member 25 slides down along slopes 46 of guides 30, it is lowered, as shown by solid lines in FIG. 4, to occupy its lower position shown in FIG. 3. When it is in this lower position, cylinder section 36 encloses the space between outlet 34 of dripper 23 and opening 8 of pot 7 while keeping lower end 51 of cylinder section 36 contacted with top 42 of pot 7.

In other words, movable member 25 is erected integral from top 42 of pot 7 so that its cylinder section 36 can shield both of outlet 34 of dripper 23 and opening 8 of pot 7 which is opposed to outlet 34 from outside air.

Timer 20 is then set to make hot water supply means 13 operative. Hot water thus made by means 13 is intermittently supplied into dripper 23 through opening 18 of means 13. Liquid coffee thus made in dripper 23 is filtered to flow into pot 7, which is located under dripper 23, through outlet 34 of dripper 23.

The space between outlet 34 of dripper 23 and opening 8 of pot 7 is shielded from outside air by cylinder section 36. Liquid coffee flowing into opening 8 of pot 7 through outlet 34 of dripper 23 can be thus shielded from outside air by cylinder section 36. Even when liquid coffee is prepared at a low room temperature, therefore, it can be prevented from becoming cold because of the low room temperature. Hot liquid coffee can be thus held in pot 7.

Movable member 25 is now rotated clockwise. Hooks 32 of movable member 25 is thus raised along slopes 46 of guides 30 and seated on planes 47 of guides 30 so that movable member 25 can be located at its upper position. Pot 7 can be removed from base 41 under this state.

Figure 7:
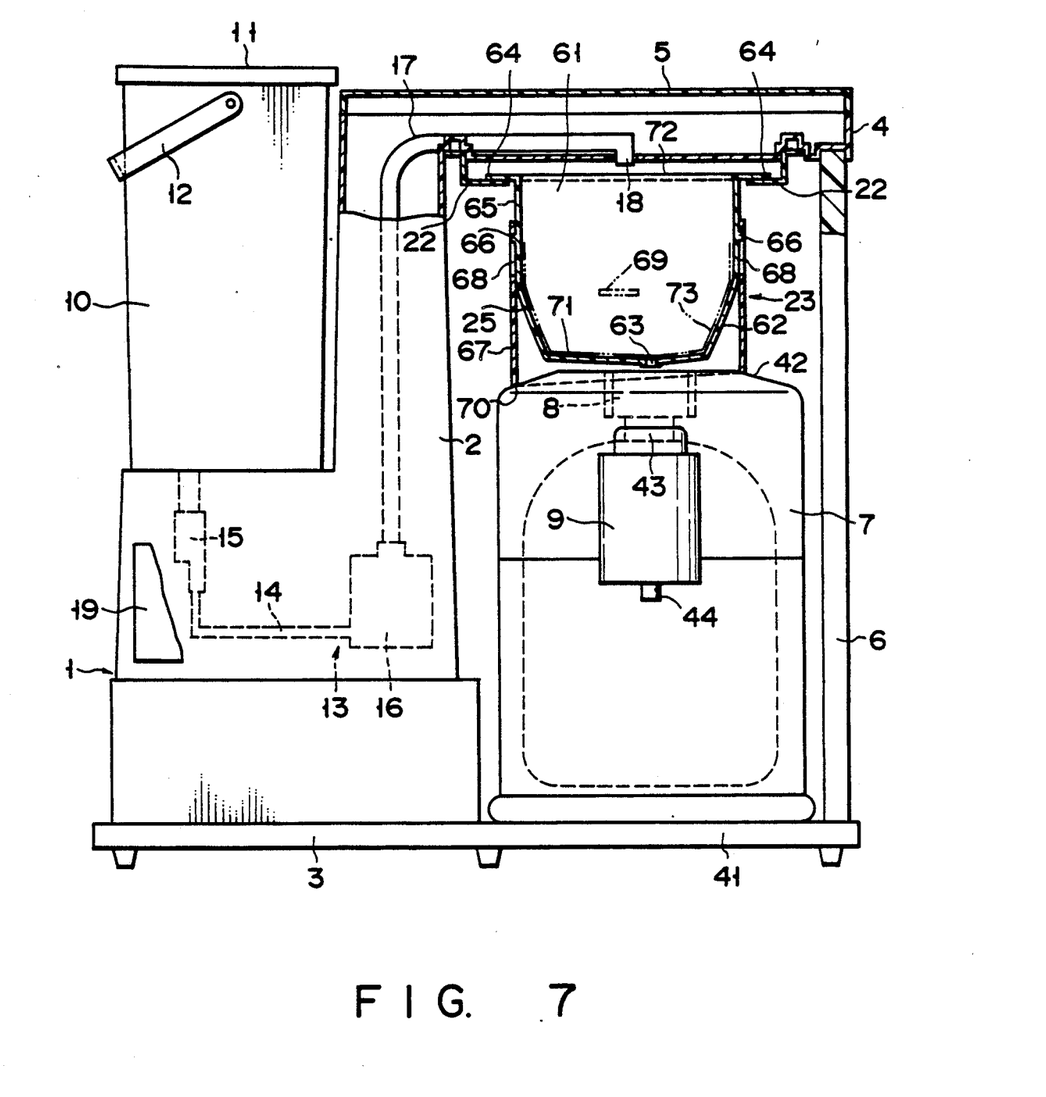
FIG. 7 is a front view showing a second embodiment of the coffee liquid making device according to the present invention partly sectioned.

FIG. 7 shows a second example of the liquid coffee making device according to the present invention. This second embodiment is different from the first embodiment of the present invention in that the outside air shielding means has no filter housing section but it is made as a cylinder member and that the holder has the filter housing section. Since the second embodiment is similar to the first embodiments in the other points, explanation of similar portions will be omitted.

Filter housing section 62 is made integral to holder 61. The top of filter housing section 62 is opened. Outlet 63 is provided in bottom 71 of filter housing section 62. Ring-shaped flange 72 is projected outward from the top rim of filter housing section 62. Left and right sides of flange 72 are used as hooks 64. Downward and upward convexes (not shown), same as those in the first embodiment, are arranged at the front side of flange 72. Holder 61 has neither of the guide provided with a slope and a plane and the stopper projection which have been used by the first embodiment. Paper filter 73 is housed in filter housing section 62 in a manner to extend along the inner surface of section 62. An appropriate amount of coffee grains are placed on filter 73.

Holder 61 has outer cylindrical face 65 which is used as a guide means. A pair of projections 66 are formed on outer circumferential face 65. The outside air shielding means is cylindrical member 67 opened at both ends thereof. Cylindrical member 67 is attached to holder 61, movable up and down, keeping its inner face contacted with outer circumferential face 65 of holder 61. Cylindrical member 67 is provided with two slits 68 which are directed in the vertical direction and into which projections 66 on outer circumferential face 65 of holder 61 are fitted. These slits 68 and projections 66 are intended to limit upward and downward movements of cylindrical member 67 relative to pot 7 and holder 61. Cylindrical member 67 can also be prevented from falling from holder 61 by projections 66. Cylindrical member 67 is provided with operation knob 69 on the outer face thereof and this operation knob 69 is shaped like a rib directed in the horizontal direction.

When cylindrical member 67 is at its lower position, its lower end 70 is contacted with top 42 of pot 7, enclosing opening 8 of pot 7. More specifically the space between outlet 63 of filter housing section 62 and opening 8 of pot 7 is enclosed by cylindrical member 67, so that liquid coffee flowing into opening 8 of pot 7 through outlet 63 of filter housing section 62 can be prevented from contacting air outside the cylindrical member 67. Namely, liquid coffee flowing from outlet 63 into opening 8 can be thermally shielded from air outside the cylindrical member 67. When cylindrical member 67 is at its upper position, it is separated from top 42 of pot 7 not to hinder pot 7 which is removed from and mounted on base 41.

Since the other operations of the second embodiment may be easily understandable from the foregoing descriptions, explanation of them will be omitted. Although FIG. 7 shows only an outline of the second embodiment, those skilled in the art could easily understand the second embodiment and put it into practice in a suitable manner.

Figure 8:
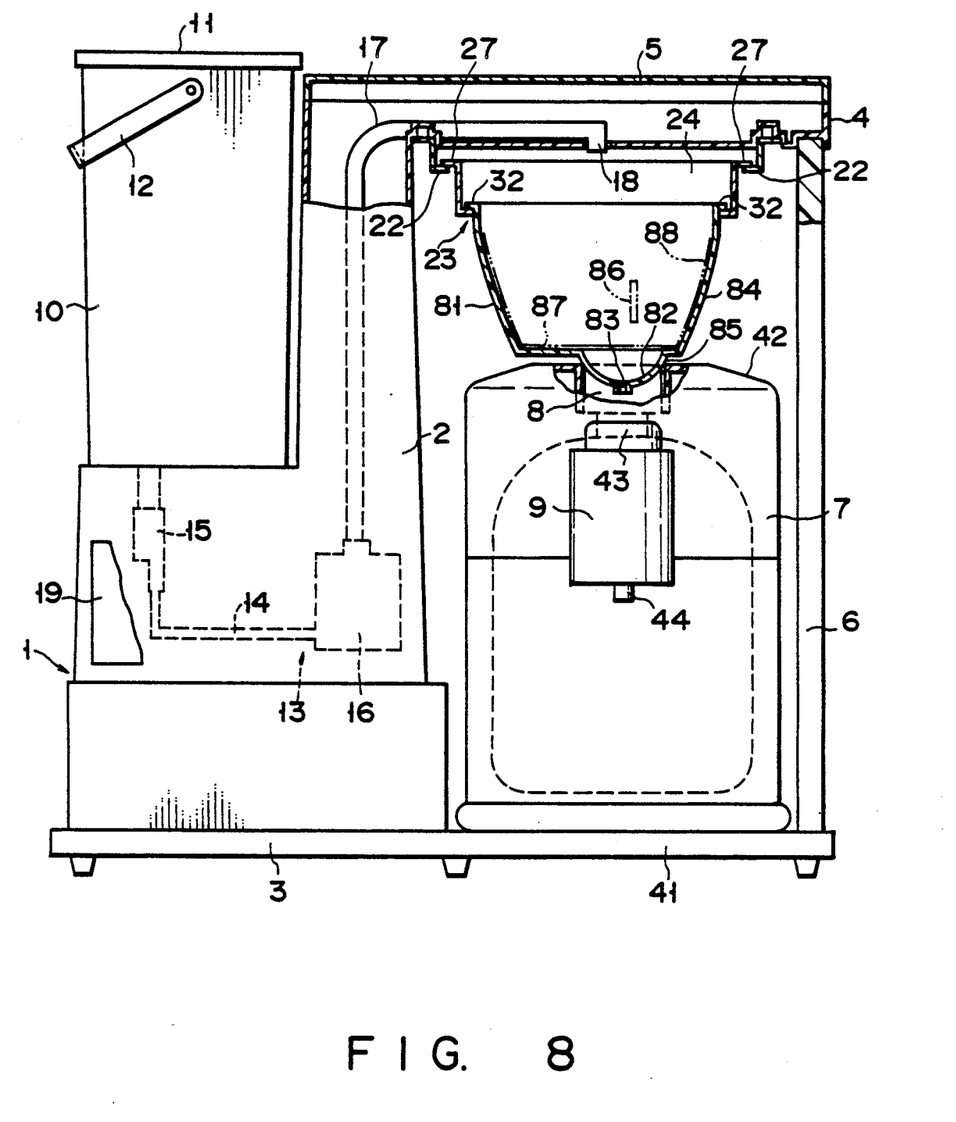
FIG. 8 is a front view showing a third embodiment of the coffee liquid making device according to the present invention partly sectioned.

FIG. 8 shows a third example of liquid coffee making device according to the present invention. This third embodiment is different from the first embodiment of the present invention by the arrangement of the outside air shielding means. Since the third embodiment is similar to the first embodiment in the other points, explanation of similar portions will be omitted.

Movable member 84 which serves as the outside air shielding means comprises filter housing section 81 whose top is opened, and hemispherical section 82 made integral to filter housing section 81. This hemispherical section 82 is formed at a part of bottom 87 of filter housing section 81 and directed downward. The whole lower portion of filter housing section 81 may be formed like hemispherical section 82. Hemi-spherical section 82 has outlet 83 at the lower end thereof. Operation projection 86 which is a vertical rib is formed integral on the outer face of movable member 84. Paper filter 88 is housed in filter housing section 81 in a manner to extend along the inner surface of section 81. An appropriate amount of coffee grains are placed on filter 88.

When movable member 84 is at its lower position, the outer face of hemispherical section 82 is contacted with rim 85 of opening 8 which is formed at top 42 of pot 7. This contact enables liquid coffee flowing from outlet 83 into opening 8 of pot 7 to be thermally shielded from air outside the movable member 84. Liquid coffee flowing from outlet 83 into opening 8 of pot 7 can be thus prevented from contacting air outside the hemispherical section 82. When movable member 84 is at its upper position, hemi-spherical section 82 is separated from top 42 of pot 7, coming out of opening 8, so that pot 7 can be freely removed from and mounted on base 41.

Since the other operations of the third embodiment may be easily understandable from the foregoing descriptions, explanation of them will be omitted. Although FIG. 7 shows only an outline of the third embodiment, those skilled in the art could easily understand the third embodiment and put it into practice in a suitable manner.

It should be understood that the present invention is not limited to the above-described embodiments but that various changes and modifications can be made without departing from the spirit and scope of the present invention. The base, for example, may be removed from the body. The present invention can be used to make black tea and other drinks as well as liquid coffee.

What is claimed is:

1. A device for making liquid coffee comprising:
   a main body having a bracket section;
   a dripper attached to the bracket section of the main body, said dripper having a filter attached thereto and an outlet formed at the bottom thereof and containing coffee powder therein;
   a liquid coffee receiver located under the dripper and having an opening which is opposed to the outlet of the dripper at a certain interval; and
   a means for supplying hot water into the dripper to make liquid coffee, which is collected in the liquid coffee receiver, passing through the outlet of the dripper and the opening of the liquid coffee receiver;
   said dripper including a holder attached to the bracket section of the main body, a means connected to the holder and movable up and down, said means serving to enclose the space between the outlet of the dripper and the opening of the liquid coffee receiver to thermally shield liquid coffee flowing through the space from outside air when it is at its lower position, and guide means formed on the holder to guide the outside air shielding means downward and upward.

2. The liquid coffee making device according to claim 1, wherein said outside air shielding means has a filter housing section and a cylindrical section, said filter housing section is opened at the top thereof and has a bottom provided with the outlet, and said cylindrical section extends from the underside of said filter housing section, enclosing the outlet at the bottom of the filter housing section, and contacts the top of said liquid coffee receiver when said outside air shielding means is at its lower position.

3. The liquid coffee making device according to claim 2, wherein said holder has a bottom provided with an opening and a ring-shaped circumferential wall erected from the bottom, said guide means are formed on the inner face of said circumferential wall at a certain interval, each of said guide means having a slope gradually rising from the bottom of said holder and a plane continuous from the top of said slope, and said filter housing section has plural hooks each projected outward from the top rim thereof and guided by the guide means.

4. The liquid coffee making device according to claim 2, wherein said bracket section of said main body has right and left rails extending in the forward direction thereof.

5. The liquid coffee making device according to claim 4, wherein said holder has a flange whose right and left sides having hooks slidably hung from the bracket section of said main body, and has an upward convex at the front side thereof to close the space between the right and left rails at the bracket section of said main body.

6. The liquid coffee making device according to claim 1, wherein said outside air shielding means has an operation projection formed on the outer circumferential face thereof.

7. The liquid coffee making device according to claim 1, wherein said liquid coffee receiver is a pot.

8. A device for making liquid coffee comprising:
   a main body having a bracket section;
   a dripper attached to the bracket section of the main body, said dripper having a filter attached thereto and an outlet formed at the bottom thereof and containing coffee powder therein;
   a liquid coffee receiver located under the dripper and having an opening which is opposed to the outlet of the dripper at a certain interval; and
   a means for supplying hot water into the dripper to make liquid coffee, which is collected in the liquid coffee receiver, passing through the outlet of the dripper and the opening of the liquid coffee receiver;
   said dripper including a holder attached to the bracket section of the main body and provided with a filter housing section whose top is opened and which has an outlet at the bottom thereof, and a means connected to the holder and movable up and down, said means serving to enclose the space between the outlet of the filter housing section and the opening of the liquid coffee receiver to thermally shield liquid coffee flowing through the space from outside air when it is at its lower position,
   said holder defined by the outer circumferential face of its upper cylindrical section and has means for guiding the outside air shielding means downward and upward, and
   said outside air shielding means having a cylindrical member opened at its both ends and movable up and down with its inner circumferential face contacted with the outer circumferential face of the cylindrical section of said holder, and said outside air shielding means contacting the top of the liquid coffee receiver at the lower end thereof when it is at its lower position.

9. A device for making liquid coffee comprising:
   a main body having a bracket section;
   dripper attached to the bracket section of the main body, said dripper having a filter attached thereto and an outlet formed at the bottom thereof and containing coffee powder therein;
   a liquid coffee receiver located under the dripper and having an opening which is opposed to the outlet of the dripper at a certain interval; and
   a means for supplying hot water into the dripper to make liquid coffee, which is collected in the liquid coffee receiver, passing through the outlet of the dripper and the opening of the liquid coffee receiver;
   said dripper including a holder attached to the bracket section of the main body, a means connected to the holder and movable up and down, said means serving to enclose the space between the outlet of the dripper and the opening of the liquid coffee receiver to thermally shield liquid coffee flowing through the space from outside air when it is at its lower position, and means formed on the holder to guide the outside air shielding means downward and upward, and said outside air shielding means having a filter housing section opened at the top thereof and provided with a hemispherical section at a part of the bottom thereof, said hemispherical section having the outlet at the lower end thereof and being contacted with the opening rim of said liquid coffee receiver when said outside air shielding means is at its lower position.

* * * * *